(12) United States Patent
Hwang et al.

(10) Patent No.: US 9,839,862 B2
(45) Date of Patent: Dec. 12, 2017

(54) METHOD FOR FABRICATING SUPER-HYDROPHOBIC SURFACE AND EVAPORATOR HAVING THE SUPER-HYDROPHOBIC SURFACE

(75) Inventors: Woon Bong Hwang, Pohang-si (KR); Sang Min Lee, Pohang-si (KR); Yeong Ae Kim, Incheon (KR)

(73) Assignee: POSITECH ACADEMY-INDUSTRY FOUNDATION, Pohang (KR)

( * ) Notice: Subject to any disclaimer, the term of this patent is extended or adjusted under 35 U.S.C. 154(b) by 945 days.

(21) Appl. No.: 14/130,025

(22) PCT Filed: Jun. 29, 2012

(86) PCT No.: PCT/KR2012/005190
§ 371 (c)(1),
(2), (4) Date: Dec. 30, 2013

(87) PCT Pub. No.: WO2013/012187
PCT Pub. Date: Jan. 24, 2013

(65) Prior Publication Data
US 2014/0182790 A1    Jul. 3, 2014

(30) Foreign Application Priority Data
Jul. 21, 2011  (KR) .......................... 10-2011-0072601

(51) Int. Cl.
*C25D 11/02* (2006.01)
*C25D 11/24* (2006.01)
(Continued)

(52) U.S. Cl.
CPC .............. *B01D 1/0011* (2013.01); *C25D 9/06* (2013.01); *C25D 11/022* (2013.01); *C25D 11/04* (2013.01);
(Continued)

(58) Field of Classification Search
CPC ......... C25D 11/04; C25D 11/18; C25D 11/24; C25D 11/246; C25D 11/26; C25D 11/022;
(Continued)

(56) References Cited

U.S. PATENT DOCUMENTS

| | | | |
|---|---|---|---|
| 4,133,725 A * | 1/1979 | Lerner | C25D 11/04 204/DIG. 8 |
| 4,199,649 A * | 4/1980 | Yundt | G03C 11/06 148/33 |

(Continued)

FOREIGN PATENT DOCUMENTS

| | | |
|---|---|---|
| CN | 1989388 | 6/2007 |
| CN | 200943979 | 9/2007 |

(Continued)

OTHER PUBLICATIONS

Hui Wang, Dan Dai, Xuedong Wu; "Fabrication of superhydrophobic surfaces on aluminum" Applied Surface Science; 254 (2008); 5599-5601.*
(Continued)

*Primary Examiner* — In Suk Bullock
*Assistant Examiner* — Jonathan Pilcher
(74) *Attorney, Agent, or Firm* — Lex IP Meister, PLLC

(57) ABSTRACT

A method for fabricating a super-hydrophobic surface having excellent surface strength and an evaporator having the super-hydrophobic surface fabricated by the method are provided. The method includes preparing a metal base material, anodizing the metal base material to form a ceramic layer having a complex structure of a microstructure and nano-fiber structures on a surface of the metal base material, and applying a hydrophobic polymer material on the complex structure to form a polymer layer having the same surface shape as the complex structure.

17 Claims, 18 Drawing Sheets

(51) Int. Cl.
*B01D 1/06* (2006.01)
*B01D 1/00* (2006.01)
*C25D 11/04* (2006.01)
*F28F 13/18* (2006.01)
*F28F 19/00* (2006.01)
*C25D 9/06* (2006.01)
*C25D 11/18* (2006.01)
*F25B 39/02* (2006.01)
*B82Y 30/00* (2011.01)
*F28D 1/047* (2006.01)
*F28D 1/053* (2006.01)

(52) U.S. Cl.
CPC ............ *C25D 11/24* (2013.01); *F28F 13/182* (2013.01); *F28F 13/187* (2013.01); *F28F 19/00* (2013.01); *B01D 1/06* (2013.01); *B01D 1/065* (2013.01); *B82Y 30/00* (2013.01); *C25D 11/02* (2013.01); *C25D 11/024* (2013.01); *C25D 11/18* (2013.01); *C25D 11/246* (2013.01); *F25B 39/02* (2013.01); *F28D 1/0472* (2013.01); *F28D 1/05391* (2013.01); *F28F 2245/04* (2013.01); *F28F 2255/20* (2013.01)

(58) Field of Classification Search
CPC .......... C25D 11/024; B01D 1/06; B01D 1/08; B01D 1/10; B01D 1/065; B01D 1/12; B01D 5/0006; B01D 5/0009; B01D 5/0012
USPC .................................. 205/324, 532
See application file for complete search history.

(56) References Cited

U.S. PATENT DOCUMENTS

| | | | | |
|---|---|---|---|---|
| 7,695,767 B2* | 4/2010 | Strauss | ............... | B05D 5/086 427/299 |
| 7,901,798 B2* | 3/2011 | Gentleman | ......... | C01F 17/0043 423/263 |
| 8,580,371 B2* | 11/2013 | Strauss | ............... | B05D 5/086 205/198 |
| 2006/0147634 A1* | 7/2006 | Strauss | ............... | B05D 5/086 427/299 |
| 2010/0116669 A1* | 5/2010 | Strauss | ............... | B05D 5/086 205/50 |
| 2011/0147219 A1* | 6/2011 | Lambourne | ............ | C25D 11/18 205/50 |

FOREIGN PATENT DOCUMENTS

| | | |
|---|---|---|
| CN | 101484612 | 7/2009 |
| CN | 101665968 | 3/2010 |
| CN | 101970726 | 2/2011 |
| CN | 102041540 | 5/2011 |
| JP | 2004-042012 | 2/2004 |
| JP | 2007-022064 | 2/2007 |
| JP | 2009-097833 | 5/2009 |
| JP | 2009-272507 | 11/2009 |
| KR | 10-2008-0004409 | 1/2008 |
| KR | 10-2010-0011213 | 2/2010 |
| KR | 10-2011-0034238 | 4/2011 |
| KR | 10-2011-0074269 | 6/2011 |
| WO | 2009-113823 | 9/2009 |

OTHER PUBLICATIONS

Aluminum Anodizers Council; "What is Anodizing"; http://www.anodizing.org/?page=what_is_anodizing.*

Raghuraman G. Karunakaran, Cheng-Hsin Lu, Zanhe Zhang, and Shu Yang; "Highly Transparent Superhydrophobic Surfaces from the Coassembly of Nanoparticles (100 nm)".*

Shah, Ramesh; "Extended Surface heat Transfer"; Thermopedia; Feb. 14, 2011.*

The Search Report(Attachment of the Office Action dated Apr. 3, 2015), China Patent Trademark Office, dated Mar. 24, 2015, Chinese Patent Application No. 201280036068.4.

* cited by examiner

METHOD FOR FABRICATING SUPER-HYDROPHOBIC SURFACE AND EVAPORATOR HAVING THE SUPER-HYDROPHOBIC SURFACE

TECHNICAL FIELD

The present invention relates to a method for fabricating a super-hydrophobic surface. More particularly, the present invention relates to a method for fabricating a super-hydrophobic surface having excellent surface strength, and an evaporator having the super-hydrophobic surface fabricated by the method.

BACKGROUND ART

A surface of a lotus leaf has a structure where nano-protrusions having a size of several hundreds of nanometers are disposed on a surface of a micro-protrusion having a size of –10 µm. The surface of the lotus leaf has super-hydrophobic and self-cleaning functions. Various methods for fabricating a super-hydrophobic surface by copying a micro-nano complex protrusion structure by a material having low surface energy are known. The super-hydrophobic surface has a merit of small contact angle hysteresis (a difference between an advancing contact angle and a receding contact angle). Accordingly, the super-hydrophobic surface is capable of being applied to various industry fields.

Among the known methods for fabricating the super-hydrophobic surface, there is a method for fabricating a super-hydrophobic surface on a wafer by using a micro-electromechanical system (MEMS). However, there are drawbacks in that the super-hydrophobic surface having an area that is larger than that of the wafer is not capable of being manufactured by the micro-electromechanical system and a manufacturing cost is very high.

Among methods proposed to overcome the drawbacks, there is a method for duplicating a micro-nano complex protrusion structure on a surface of a metal base material by (1) applying collision energy to the surface of the metal base material to form a micro-groove, (2) anodizing the metal base material to form nano-grooves in the micro-groove, and (3) applying a polymer material to the surface of the metal base material and then performing separation. This method has merits in that a size is not limited and the duplicated polymer material is flexible to be attachable to various three-dimensional articles.

However, in the aforementioned method, it takes a long time to perform anodizing and polymer duplication processes, and the super-hydrophobic surface is embodied by only the polymer material. Accordingly, surface strength is weak as compared to a metal surface. Further, the duplicated polymer material should be attached to the surface of the article for embodying the super-hydrophobic surface. Accordingly, it is difficult to apply the aforementioned method to the surface of a complicated and three-dimensional article.

The above information disclosed in this Background section is only for enhancement of understanding of the background of the invention and therefore it may contain information that does not form the prior art that is already known in this country to a person of ordinary skill in the art.

DISCLOSURE

Technical Problem

The present invention has been made in an effort to provide a method for fabricating a super-hydrophobic surface having surface strength that is similar to that of a metal surface and reducing a total fabrication time, and an evaporator having the super-hydrophobic surface fabricated by the method.

Technical Solution

An exemplary embodiment of the present invention provides a method for fabricating a super-hydrophobic surface. The method includes preparing a metal base material, anodizing the metal base material to form a ceramic layer having a complex structure of a microstructure and nano-fiber structures on a surface of the metal base material, and applying a hydrophobic polymer material on the complex structure to form a polymer layer having the same surface shape as the complex structure.

The metal base material may include at least one selected from the group consisting of aluminum, nickel, titanium, magnesium, and zinc.

Nano-holes may be formed in the ceramic layer during an early stage of the anodizing. Wall surfaces of the nano-holes may collapse due to enlargement of the nano-holes according to progress of the anodizing, and wall surfaces having a high density may remain at a center to form the complex structure formed of the nano-fiber structures and mountain range-shaped microstructures.

During the anodizing, a temperature of an electrolyte solution may be in a range of 0 to 40° C., and a voltage applied to the metal base material and a counter electrode may be in a range of 20 to 200 V. An application time of the voltage to the metal base material and the counter electrode may be in a range of 5 to 10 minutes.

The polymer layer may include at least one selected from the group consisting of polydimethylsiloxane (PDMS), polytetrafluoroethylene (PTFE), a fluorinated ethylene propyl copolymer (FEP), a perfluoroalkoxy (PFA), and (heptadecafluoro-1,1,2,2-tetrahydrodecyl)-trichlorosilane (HDFS).

The polymer layer may be coated with a monomolecular layer, and may have a thickness in a range of 1 Å or more and 5 nm or less.

Another exemplary embodiment of the present invention provides an evaporator including a coolant tube including a coolant flowing therein to exchange heat with fluidized air therearound. The coolant tube may be constituted by a metal base material, and an external circumferential surface of the coolant tube may have a super-hydrophobic surface fabricated by the aforementioned method.

Yet another exemplary embodiment of the present invention provides an evaporator including an upper header tank and a lower header tank positioned to be spaced apart from each other. A plurality of coolant tubes are fixed to the upper header tank and the lower header tank at both ends thereof and form a coolant flow path. A plurality of heat exchanger fins come into contact with the coolant tubes, are positioned between the coolant tubes, and come into contact with external air at surfaces thereof. The heat exchanger fins may be constituted by a metal base material, and may have a super-hydrophobic surface fabricated by the aforementioned method.

The heat exchanger fins may be bent in a zigzag pattern to form a waveform structure.

Advantageous Effects

According to the exemplary embodiment of the present invention, the super-hydrophobic surface is strong to external impact or friction and has high durability because it has the same surface rigidity of ceramic, and time for processing can be effectively shortened. In addition, the super-hydrophobic surface can be easily formed at a surface of a complicated and stereoscopic product.

MODE FOR INVENTION

Hereinafter, exemplary embodiments of the present invention will be described in detail with reference to the accompanying drawings so that those skilled in the art may easily practice the present invention. As those skilled in the art would realize, the described embodiments may be modified in various different ways, all without departing from the spirit or scope of the present invention.

Figure 1:
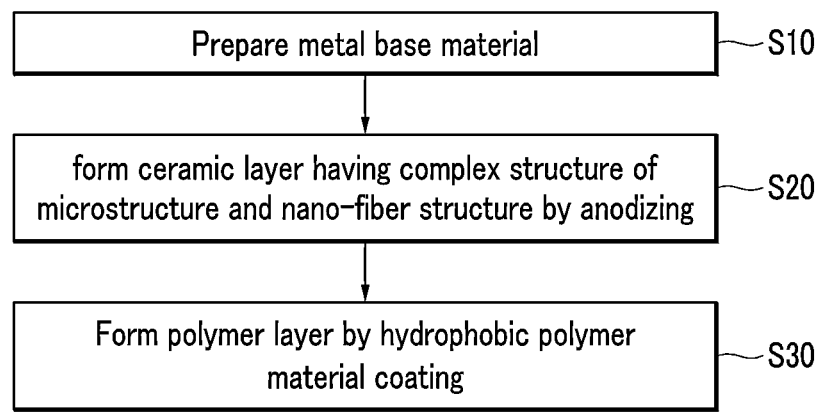
FIG. 1 is a process flowchart showing a method for fabricating a super-hydrophobic surface according to an exemplary embodiment of the present invention.
Figure 2:
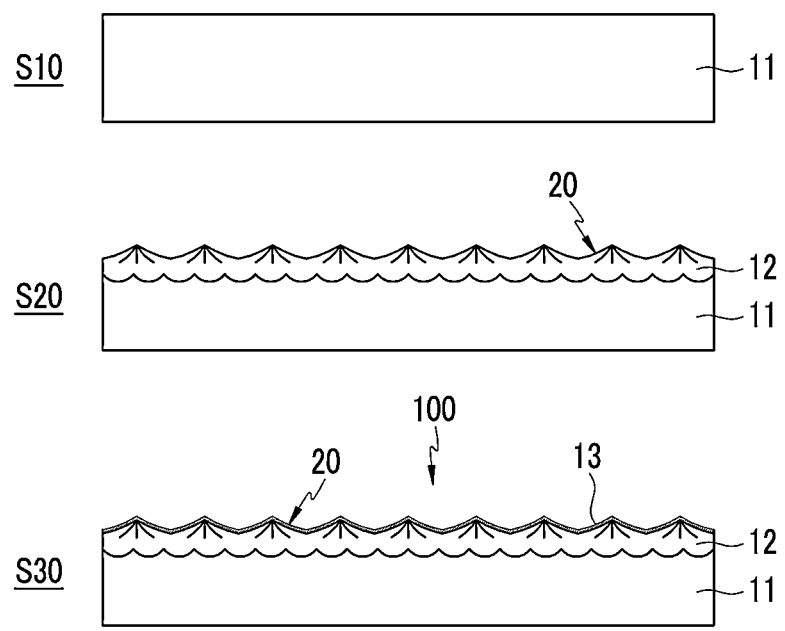
FIG. 2 is a view schematically showing a cross-sectional state for each step shown in FIG. 1.

FIG. 1 is a process flowchart showing a method for fabricating a super-hydrophobic surface according to an exemplary embodiment of the present invention, and FIG. 2 is a view schematically showing a cross-sectional state for each step shown in FIG. 1.

Referring to FIGS. 1 and 2, the method for fabricating a super-hydrophobic surface 100 according to the present exemplary embodiment includes a first step of preparing a metal base material 11 (S10), a second step of anodizing the metal base material 11 to form a ceramic layer 12 having a complex structure 20 of microstructures and nano-fiber structures on a surface of the metal base material 11 (S20), and a third step of applying a hydrophobic polymer material on the complex structure 20 to form a polymer layer 13 having the same surface shape as the complex structure 20 (S30).

The polymer layer 13 includes air between the microstructures and between the nano-fiber structures to minimize a contact area with water. Accordingly, the polymer layer 13 embodies the super-hydrophobic surface that is not infiltrated by water drops. In this case, the polymer layer 13 is not separated from the metal base material 11, is not present alone, and is positioned on the ceramic layer 12 (metal oxide layer) by anodizing. Accordingly, the polymer layer 13 has surface rigidity that is as high as that of ceramics.

Herein, a micro-scale means a size in the range of 1 μm or more and less than 1000 μm, and a nano-scale means a size in the range of 1 nm or more and less than 1000 nm.

In the first step S10, the metal base material 11 is a metal capable of being anodized, and may include aluminum, nickel, titanium, magnesium, and zinc. The metal base material 11 is not limited to have a specific shape, and includes all metal articles embodying the super-hydrophobic surface. FIG. 2 shows the plate-shaped metal base material 11 as an example, but the shape of the metal base material 11 is not limited to the example shown in FIG. 2.

Figure 3:
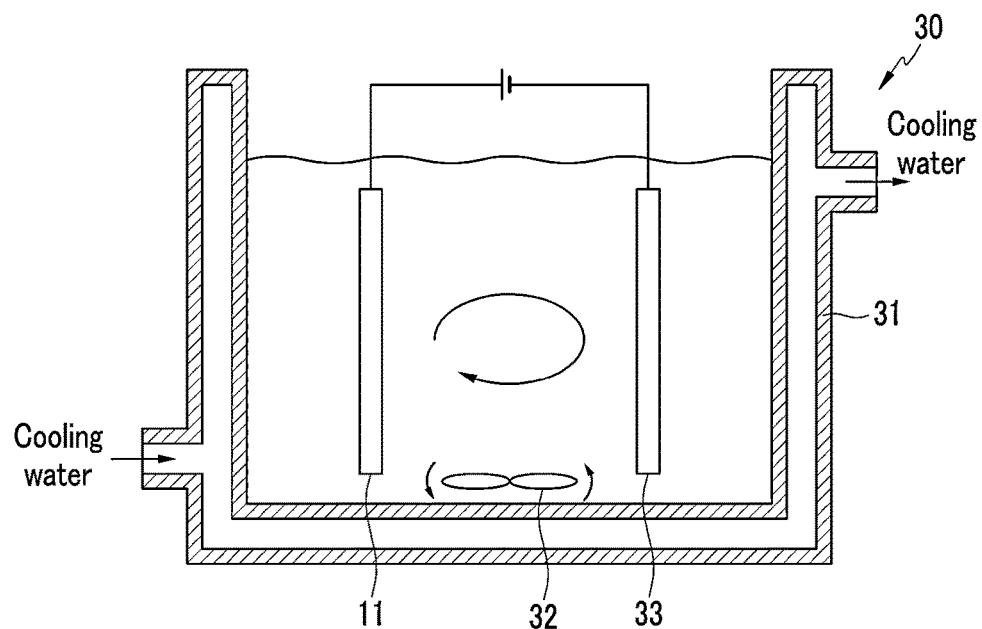
FIG. 3 is a schematic diagram showing an anodizing device used during a second step of FIG. 1.

FIG. 3 is a schematic diagram showing an anodizing device used during the second step of FIG. 1.

Referring to FIG. 3, an anodizing device 30 includes a circulation-type water tank 31 in which cooling water circulates, and a magnet agitator 32 agitating an electrolyte solution in the water tank 31 at a predetermined speed.

An anodizing process of the second step S20 includes procedures of immersing the metal base material 11 and a counter electrode 33 while the metal base material 11 and the counter electrode 33 are spaced apart from each other into the electrolyte solution in the water tank 31, and applying an anode power source and a cathode power source to the metal base material 11 and the counter electrode 33, respectively. The electrolyte solution may include at least one of oxalic acid ($C_2H_2O_4$), phosphoric acid ($H_3PO_4$), and sulfuric acid ($H_2SO_4$), and the counter electrode 33 may include aluminum or platinum.

In this case, the temperature of the electrolyte solution may be in the range of 0 to 40° C. A voltage applied to the metal base material 11 and the counter electrode 33 may be in the range of 20 to 200 V. In addition, a voltage application time may be in the range of 5 to 10 minutes. When the aforementioned conditions are satisfied, the complex structure 20 of the microstructure and the nano-fiber structure may be formed on the surface of the ceramic layer 12 (metal oxide layer) on the metal base material 11.

Specifically, when the temperature of the electrolyte solution and a voltage difference between the metal base material 11 and the counter electrode 33 deviate from the aforementioned range, the complex structure of the microstructure and the nano-fiber structure is not formed on the surface of the ceramic layer 12. That is, when the aforementioned conditions are not satisfied, the microstructure is not formed and the nano-fiber structure is not formed on the surface of the ceramic layer 12. When the voltage application time is satisfied in the range of 5 to 10 minutes, super-hydrophobicity of a contact angle of 150° or more may be embodied.

The anodizing process of the present exemplary embodiment includes procedures of forming nano-holes on the surface of the ceramic layer 12, and then enlarging the nano-holes. Then, wall surfaces of the nano-holes start to collapse and only wall surfaces having a high density remain at the center. Accordingly, the complex structure 20 formed of the nano-fiber structures and the mountain range-shaped microstructure is completed.

Figure 4A:
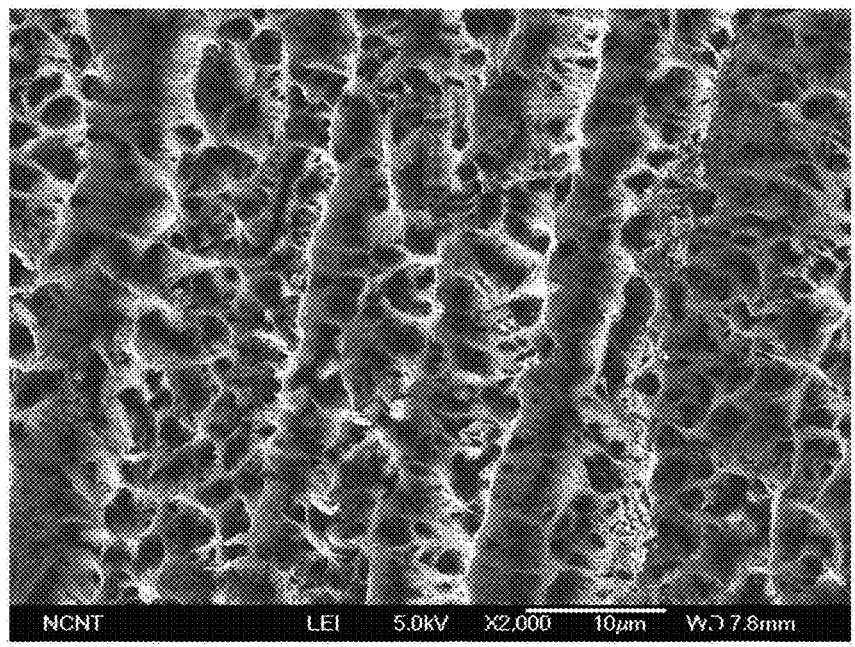
FIG. 4A is a scanning electron microscopic picture of a surface of a ceramic layer subjected to an anodizing process of the second step.
Figure 4B:
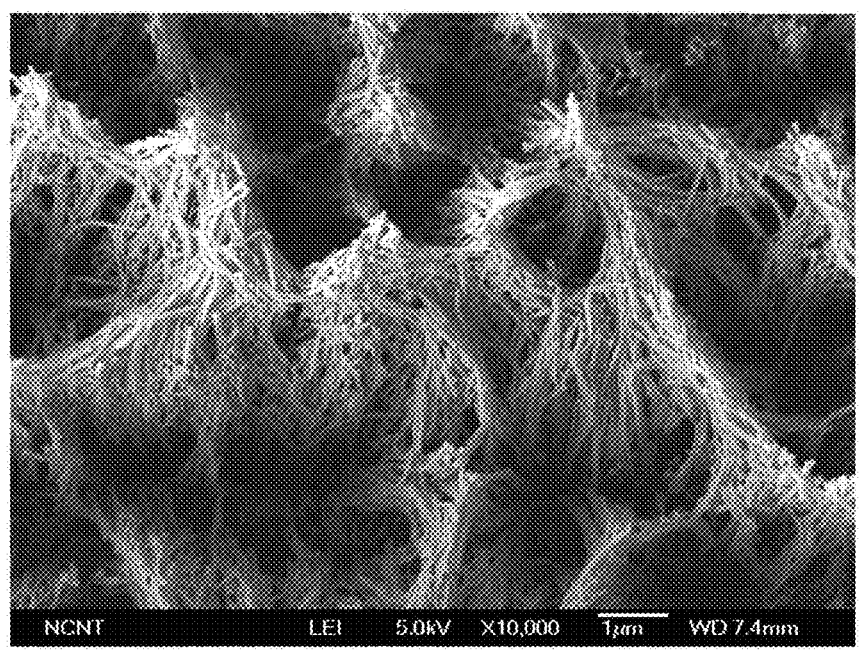
FIG. 4B is a partially enlarged picture of FIG. 4A.

FIG. 4A is a scanning electron microscopic picture of the surface of the ceramic layer subjected to the anodizing process of the second step, and FIG. 4B is a partially enlarged picture of FIG. 4A.

Referring to FIGS. 4A and 4B, the nano-fiber structures having a thin and long fiber shape are formed on the surface of the ceramic layer 12. In the nano-fiber structures, the wall surfaces having the high density remain. The nano-fiber structures do not remain alone, and the wall surfaces having the high density are collected and remain at the center. Accordingly, the mountain range-shaped microstructure is formed.

The nano-fiber structures may have a wire shape or a rod shape. A thin and long structure having a large aspect ratio is commonly called a nano-fiber structure. In the present exemplary embodiment, for convenience, the aforementioned nano-structure is called "nano-fiber structure". The ceramic layer 12 has hydrophilicity. Super-hydrophilicity is obtained by forming the aforementioned complex structure 20.

FIGS. 5A to 5D are scanning electron microscopic pictures showing a change in the surface of the ceramic layer according to an anodizing time. In FIGS. 5A to 5D, upper pictures show the surface of the ceramic layer, and lower pictures show a cross-section of the ceramic layer.

Figure 5A:
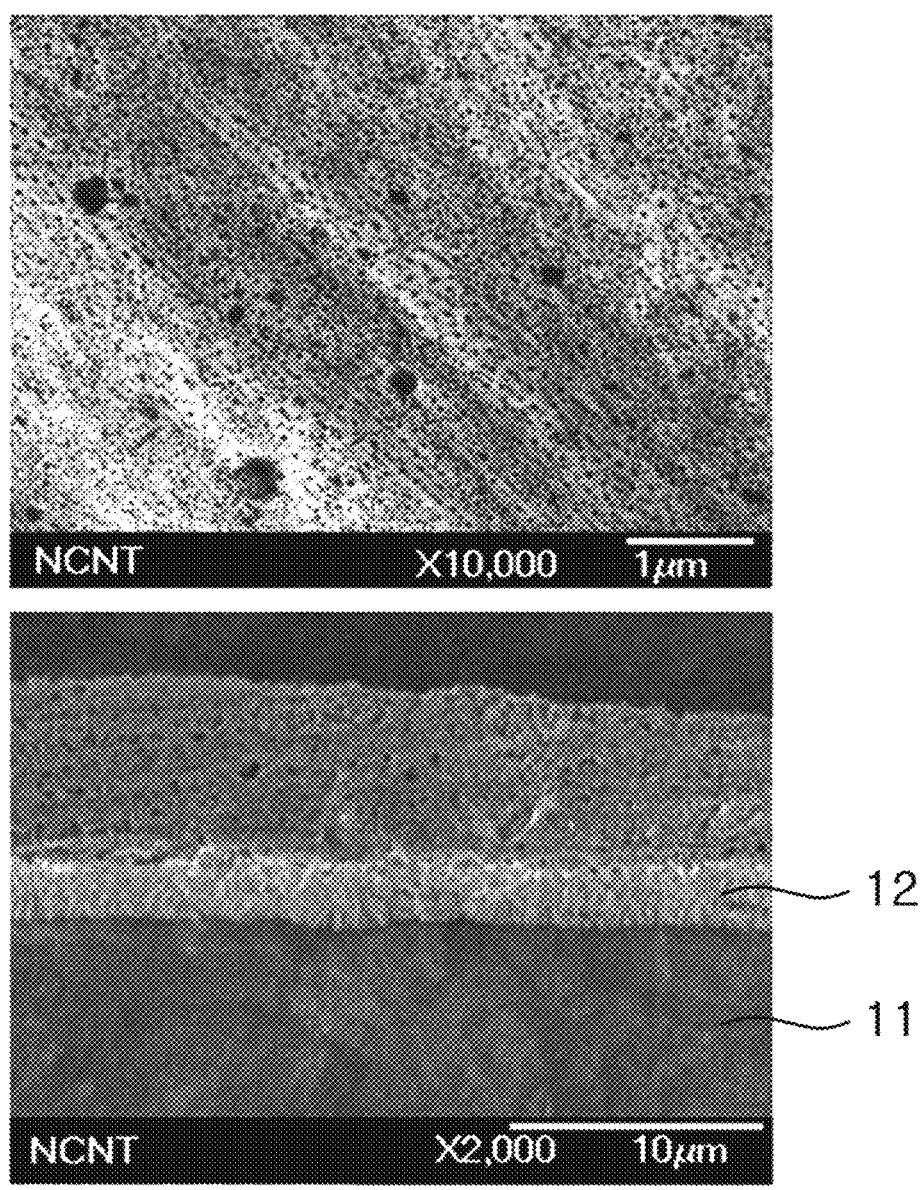
FIGS. 5A to 5D are scanning electron microscopic pictures showing a change in the surface of the ceramic layer according to an anodizing time.
Figure 5B:
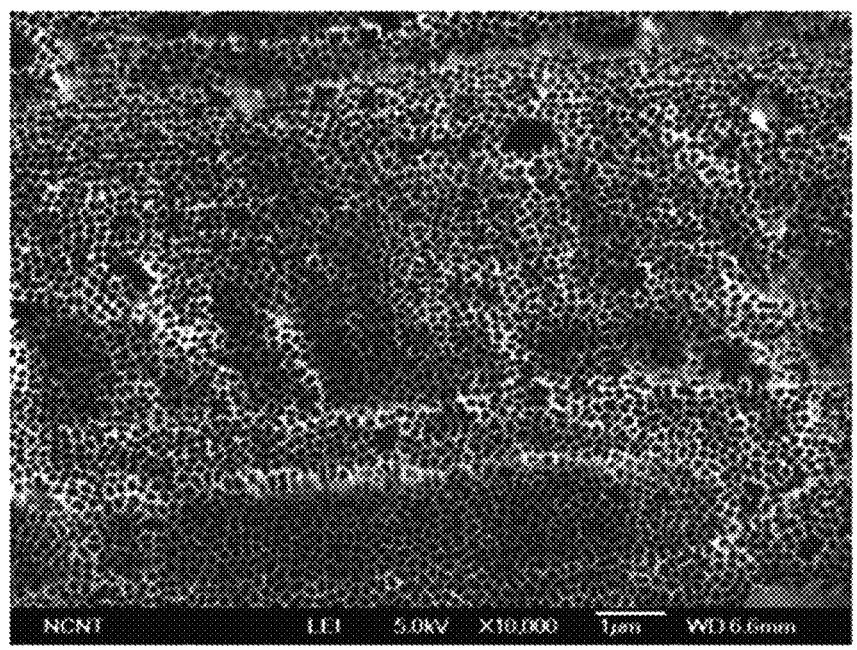
Figure 5B:
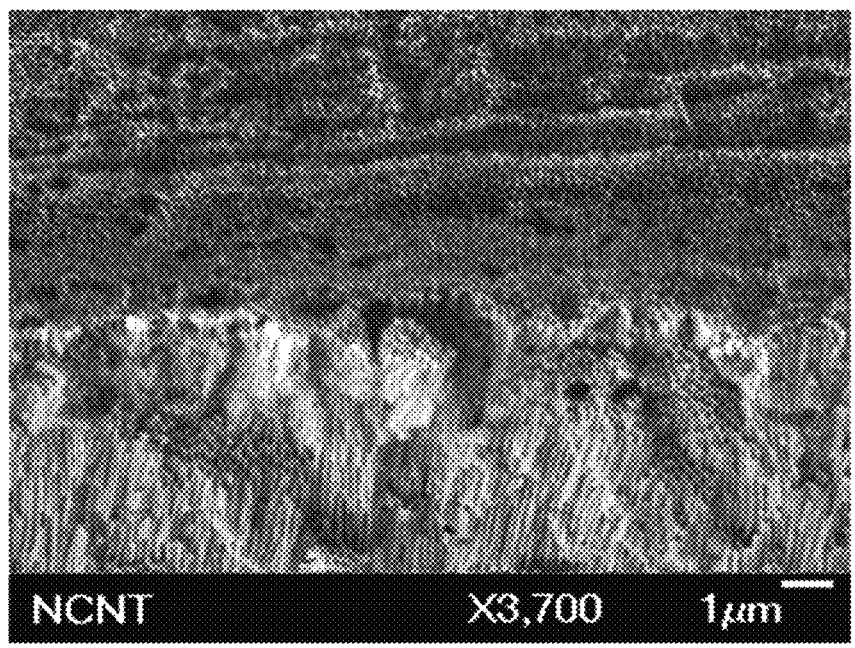
Figure 5C:
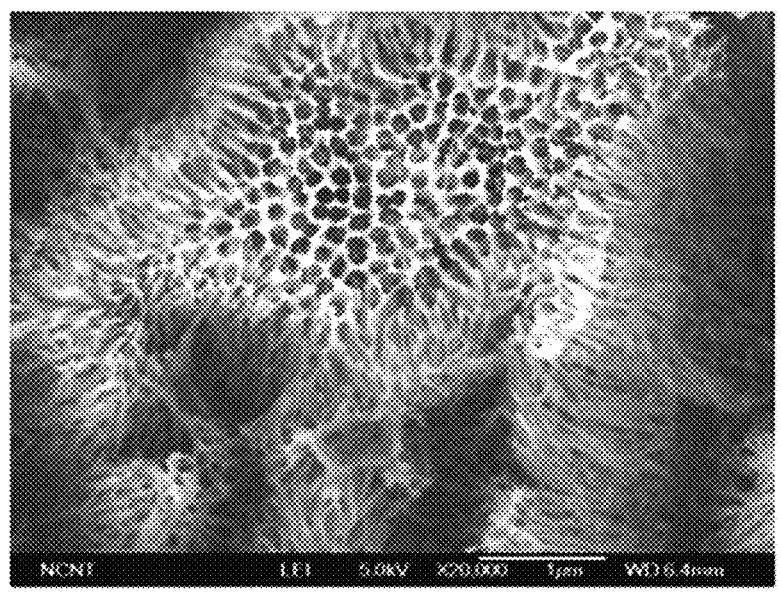
Figure 5C:
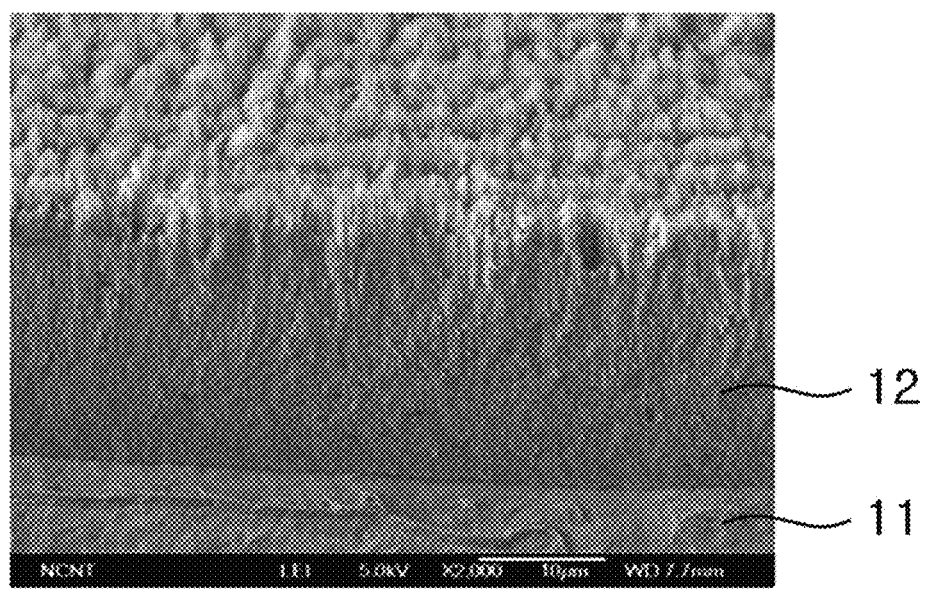
Figure 5D:
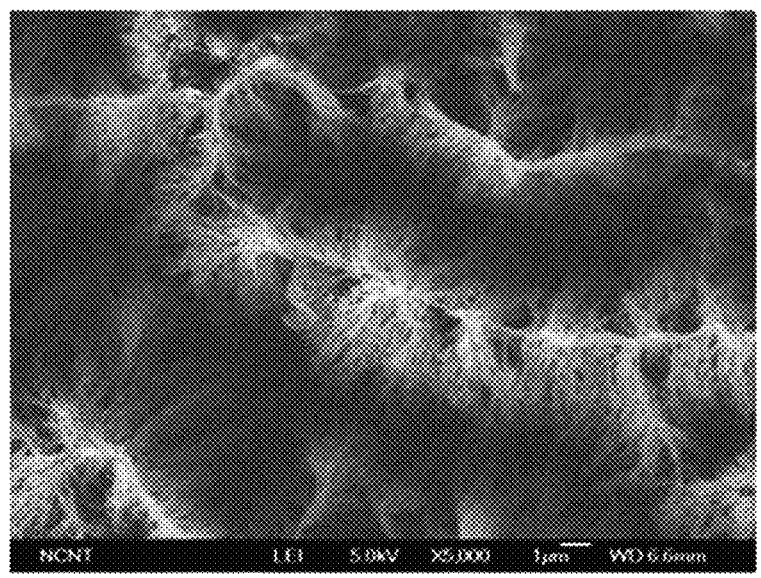
Figure 5D:
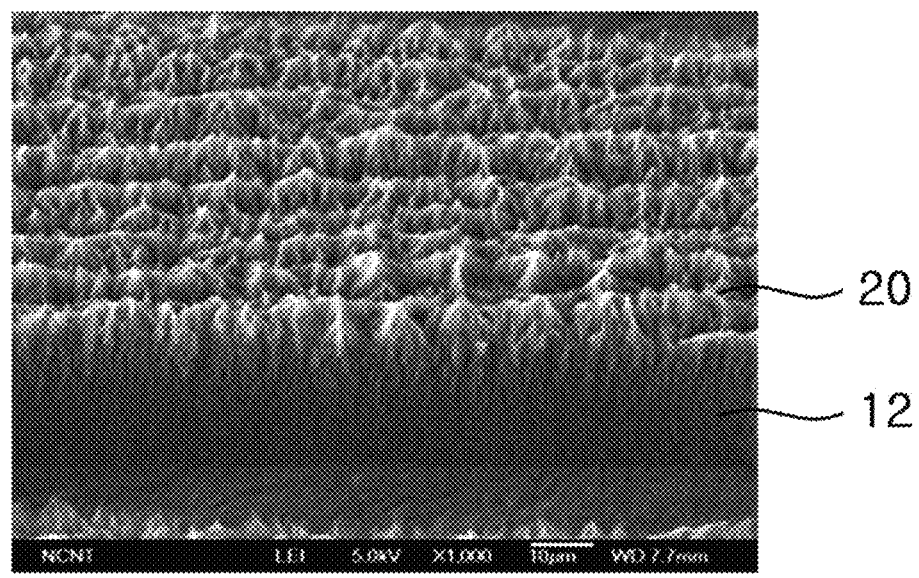

Referring to FIGS. 5A to 5D, during an early stage of the anodizing, the surface of the metal base material 11 is oxidized to form the ceramic layer 12, and the fine nano-holes are formed on the surface of the ceramic layer 12 (FIG. 5A). The size and the depth of the nano-holes are increased according to progress of the anodizing (FIG. 5B). The wall surfaces around the nano-holes start to collapse due to enlargement of the nano-holes, and only wall surfaces having the high density remain at the center (FIGS. 5C and 5D).

Accordingly, as shown in FIG. 5D, the remaining wall surfaces around the nano-holes form the nano-fiber structures and the microstructures to complete the complex structure 20 of the ceramic layer 12. In FIGS. 4A to 5D, the metal base material 11 is aluminum, and the ceramic layer 12 is formed of alumina.

Figure 6:
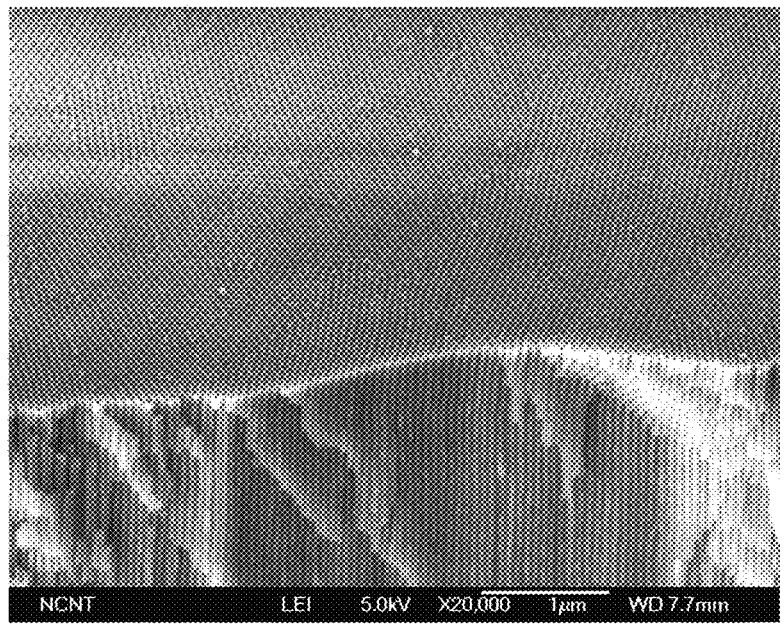
FIG. 6 is a scanning electron microscopic picture of a surface of a ceramic layer according to a comparative example.

FIG. 6 is a scanning electron microscopic picture of a surface of a ceramic layer according to a comparative example manufactured when the temperature of the electrolyte solution and the voltage difference between the metal base material and the counter electrode do not satisfy conditions of the exemplary embodiment. Referring to FIG. 6, it can be confirmed that a plurality of nano-holes are formed and the complex structure of the microstructure and the nano-fiber structure of the present exemplary embodiment is not formed on the surface of the ceramic layer of the comparative example.

Referring back to FIG. 2, during the third step (S30), the polymer material having hydrophobicity is applied on the complex structure 20. Accordingly, the polymer layer 13 having the same surface shape as the complex structure 20 is formed on the surface of the ceramic layer 12. The polymer layer 13 may include at least one of (heptadecafluoro-1,1,2,2-tetrahydrodecyl)-trichlorosilane (HDFS), polydimethylsiloxane (PDMS), polytetrafluoroethylene (PTFE), a fluorinated ethylene-propyl copolymer (FEP), and a perfluoroalkoxy (PFA).

The polymer layer 13 has hydrophobicity due to the material thereof. The polymer layer 13 is bonded to the surface of the ceramic layer 12 due to a characteristic of the material, and is applied as a monomolecular type to provide the same pattern as the complex structure 20 formed on the ceramic layer 12. That is, the nano-fiber structures and the microstructures corresponding to the complex structure 20 of the ceramic layer 12 are formed even in the polymer layer 13. The polymer layer 13 is a monomolecular layer, and may have a thickness in the range of 1 Å to 5 nm.

In the case of the polymer layer 13 including HDFS, the HDFS polymer layer 13 may be applied on the surface of the ceramic layer 12 by mixing HDFS and hexane at a ratio of 1:1000, immersing the metal base material 11 on which the ceramic layer 12 is formed into the mixture solution for 10 minutes or less, and performing hexane and water washing processes.

The microstructure formed in the polymer layer 13 has a higher portion corresponding to a peak and a lower portion corresponding to a valley. The higher portion corresponding to the peak acts as a micro-protrusion for embodying super-hydrophobicity. In addition, each of the nano-fiber structures formed in the polymer layer 13 acts as a nano-protrusion for embodying super-hydrophobicity.

The polymer layer 13 includes air between the microstructures and between the nano-fiber structures to minimize a contact area with water. Thereby, super-hydrophobicity of a contact angle of more than 150° is obtained.

Figure 7:
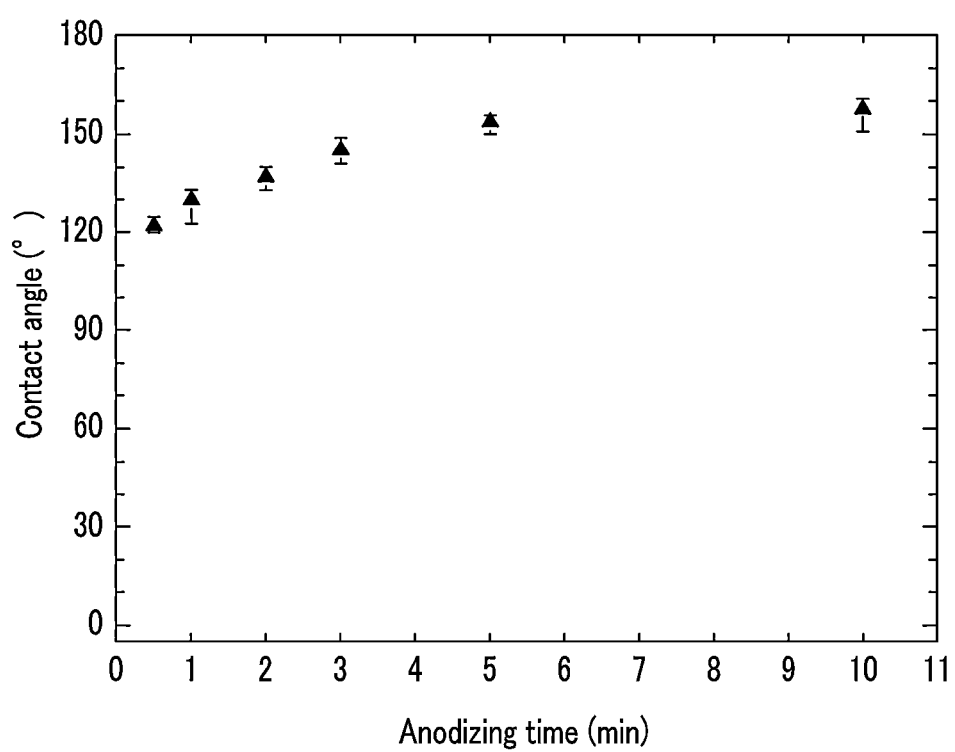
FIG. 7 is a graph showing a change in contact angle of the super-hydrophobic surface according to the anodizing time.

FIG. 7 is a graph showing a change in contact angle of the super-hydrophobic surface according to the anodizing time.

Referring to FIG. 7, it can be confirmed that the contact angle has a value of less than 150° at 5 minutes after the anodizing starts and of more than 150° after about 5 minutes. On the other hand, even if the anodizing time is more than 10 minutes, there is no large change in contact angle. Accordingly, it is preferable that the anodizing time be 5 to 10 minutes to embody super-hydrophobicity of 150° or more.

In the super-hydrophobic surface 100 completed according to the present exemplary embodiment, the polymer layer is not present alone but the metal base material 11 and the ceramic layer 12 are intactly maintained. Accordingly, almost the same surface rigidity as the ceramic layer 12 is embodied. Accordingly, even when an external impact or friction is applied, the shape of the super-hydrophobic surface 100 may be intactly maintained, such that high durability may be secured.

Further, a time required to perform the anodizing is within 10 minutes, and a time required to perform coating is very short because the polymer layer 13 is coated with the monomolecular layer. Accordingly, a surface fabrication time may be effectively reduced. Moreover, the polymer layer 13 is not attached to a surface of an article, but the article made of metal is subjected to surface treatment to embody the super-hydrophobic surface 100. Accordingly, the super-hydrophobic surface 100 may be easily formed on the surface of the complicated and three-dimensional article.

Figure 8:
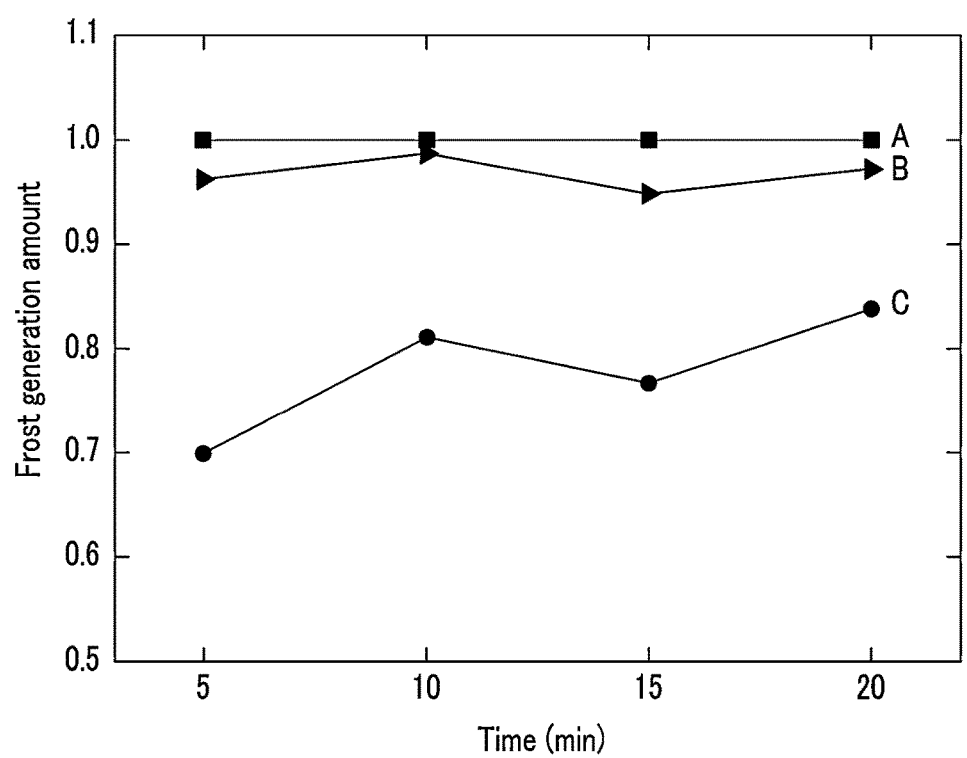
FIG. 8 is a graph obtained by measuring a frost generation amount according to time.

FIG. 8 is a graph obtained by measuring a frost generation amount according to time.

In FIG. 8, line A represents a general aluminum surface, and line B represents a general aluminum surface coated with a hydrophobic polymer. Line C represents the super-hydrophobic surface coated with the hydrophobic polymer according to the present exemplary embodiment. In FIG. 8, assuming that the frost generation amount of the general aluminum surface (line A) is 1, the frost generation amounts of lines B and C are shown as comparative values based on that of line A. A temperature condition applied to an experiment is 27° C., i.e., normal temperature.

Referring to FIG. 8, it can be confirmed that generation of frost is largely delayed on the super-hydrophobic surface according to the present exemplary embodiment as compared to the general aluminum surface and the general aluminum surface coated with the hydrophobic polymer, and thus the frost is generated in a smaller amount on the surface under the same time condition.

Figure 9A:
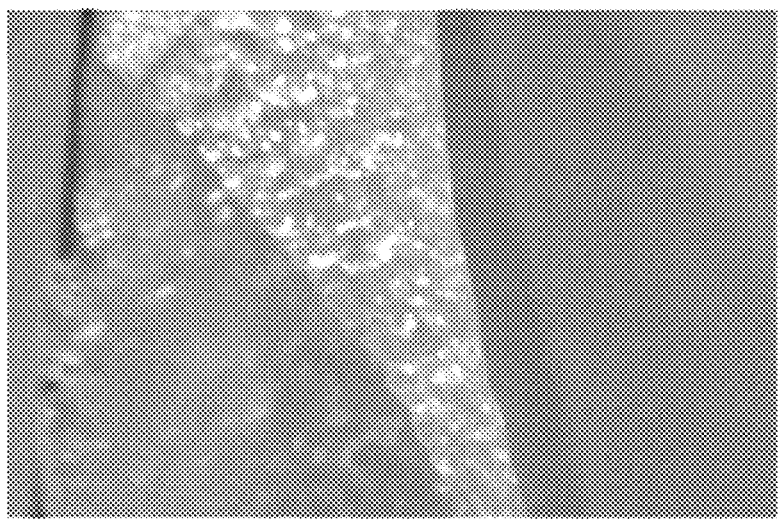
FIG. 9A is a picture showing a frost removal process of the super-hydrophobic surface according to the present exemplary embodiment.
Figure 9B:
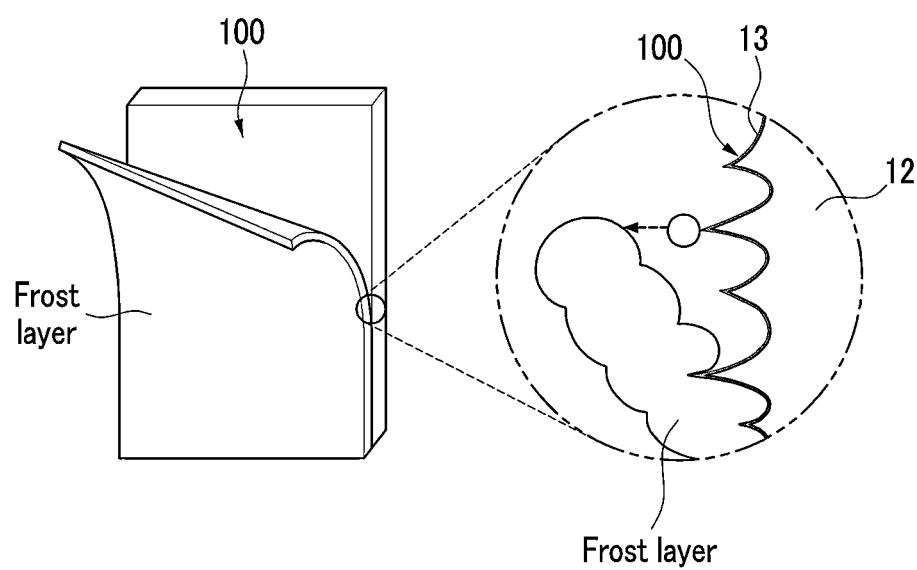
FIG. 9B is a schematic diagram of FIG. 9A.

FIG. 9A is a picture showing a frost removing process of the super-hydrophobic surface according to the present exemplary embodiment, and FIG. 9B is a mimetic diagram of FIG. 9A.

Referring to FIGS. 9A and 9B, in the super-hydrophobic surface 100 of the present exemplary embodiment, the polymer layer 13 has the same surface shape as the complex structure of the microstructure and the nano-fiber structures. It can be confirmed that the frost generated on the super-hydrophobic surface 100 forms a single layer and peels away from the surface.

Accordingly, even though the frost is generated on the super-hydrophobic surface 100 of the present exemplary embodiment, the frost may be removed at once. Therefore, a rapid and complete defrosting effect may be embodied.

Figure 10:
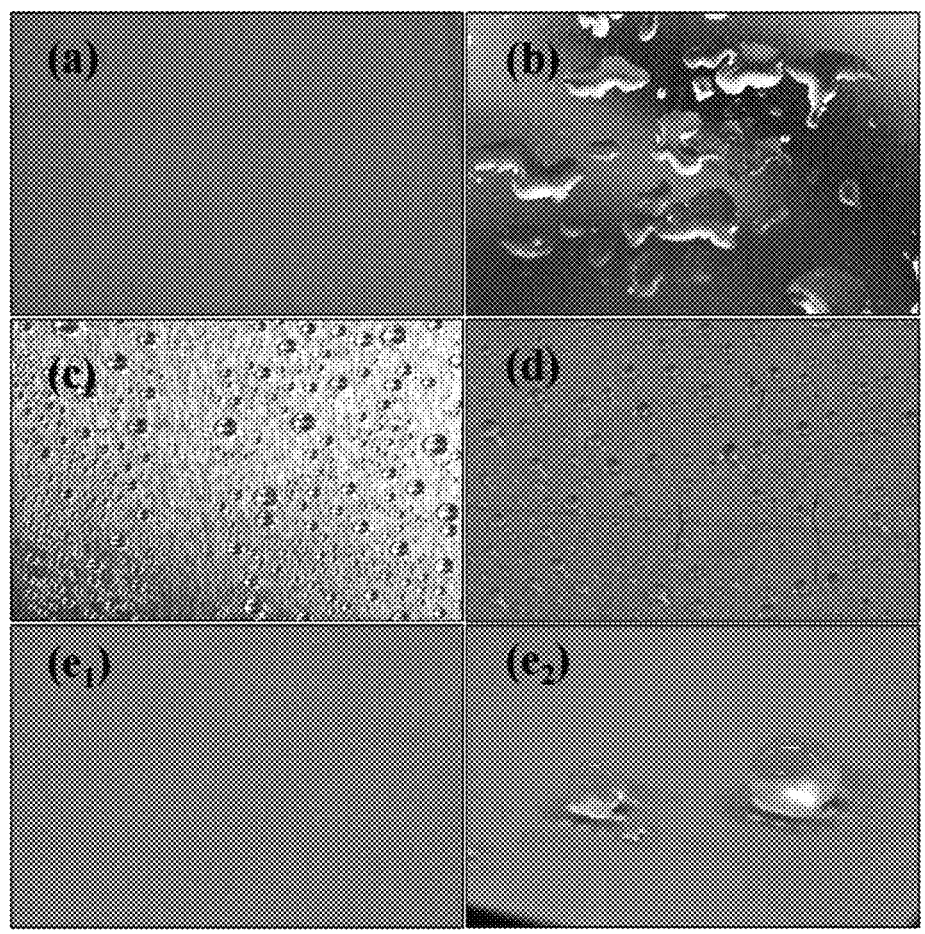
FIG. 10 is a picture showing anodized general aluminum, general aluminum, general aluminum coated with a hydrophobic polymer, a hydrophobic surface formed of only a duplicated hydrophobic polymer layer, and the super-hydrophobic surface according to the present exemplary embodiment.

FIG. 10 is a picture showing anodized general aluminum, general aluminum, general aluminum coated with the hydrophobic polymer, a hydrophobic surface formed of only a duplicated hydrophobic polymer layer, and the super-hydrophobic surface according to the present exemplary embodiment. Pictures (a) to (e1) are photographed while the surface is vertically erected, and (e2) is a picture photographed while the surface is parallel to the ground.

In FIG. 10, (a) is the anodized general aluminum surface, and (b) is the general aluminum surface, wherein (a) shows the surface completely covered with the frost, and (b) shows a state where water drops are formed on the surface. In FIG. 10, (c) is the general aluminum surface coated with the hydrophobic polymer, and (d) is the hydrophobic surface formed of only the duplicated hydrophobic polymer layer which has a micro-nano complex protrusion structure.

It can be confirmed that in (b), (c), and (d) of FIG. 10, the frost is not completely removed but forms the water drops and is present on the surface.

(e1) and (e2) of FIG. 10 are the super-hydrophobic surface according to the present exemplary embodiment, in which the frost is completely removed. Further, it can be confirmed that when the water drops fall on the surface after the frost is removed, the water drops agglomerate to intactly maintain super-hydrophobicity.

As described above, in the case of the super-hydrophobic surface 100 of the present exemplary embodiment, implantation due to condensation of the water drops is delayed, and the generated frost is removed at once in a single layer form. Accordingly, the rapid and complete defrosting effect may be embodied.

The aforementioned super-hydrophobic surface 100 may be availably applied to various types of heat exchangers, particularly, an evaporator absorbing ambient heat to reduce an ambient temperature. Hereinafter, the structure of the evaporator and an application position of the super-hydrophobic surface will be described with reference to FIGS. 11 to 14.

Figure 11:
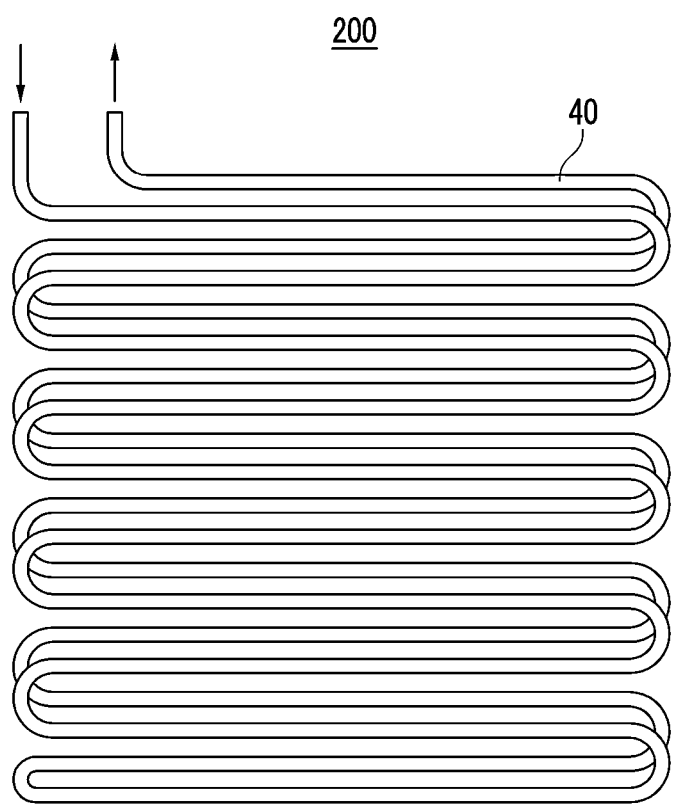
FIG. 11 is a schematic diagram of an evaporator according the exemplary embodiment of the present invention.
Figure 12:
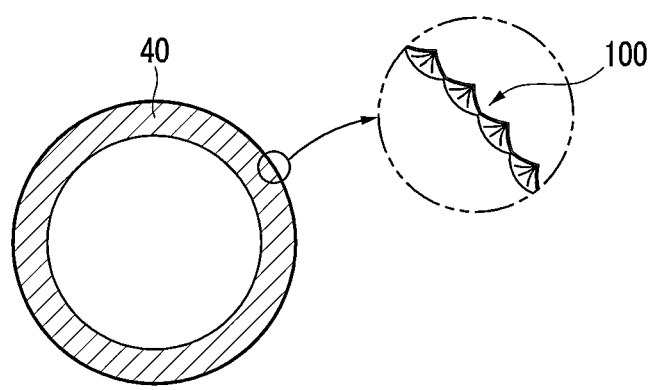
FIG. 12 is a cross-sectional view of the evaporator shown in FIG. 11.

FIG. 11 is a schematic diagram of the evaporator according the exemplary embodiment of the present invention, and FIG. 12 is a cross-sectional view of the evaporator shown in FIG. 11. A tube-type evaporator shown in FIG. 11 is applied to a refrigerator.

Referring to FIGS. 11 and 12, an evaporator 200 is constituted by a coolant tube 40 including a coolant flowing therein to exchange heat with fluidized air therearound. An inlet of the coolant tube 40 may be connected to an expansion valve (not shown), and an outlet of the coolant tube 40 may be connected to a compressor (not shown). A liquid coolant flowing into the coolant tube 40 is vaporized into a gas coolant while passing through the expansion valve (not shown), and deprives ambient air of heat to cool the ambient air.

The coolant tube 40 is manufactured of a metal capable of being anodized, and an external surface thereof is fabricated through the second step of the anodizing (S20) and the third step of polymer coating (S30) to form the super-hydrophobic surface 100. That is, an external circumferential surface of the coolant tube 40 is formed of the super-hydrophobic surface 100 of the present exemplary embodiment.

Implantation of the frost on the external surface of the coolant tube 40 is delayed, and the generated frost is removed at once in a single layer form. Accordingly, the excellent defrosting effect may be obtained. The disposal structure of the coolant tube 40 is not limited to the shown example, and is capable of being variously modified. Further, various members such as plate-shaped fins are capable of being bonded to the outside of the coolant tube 40.

Figure 13:
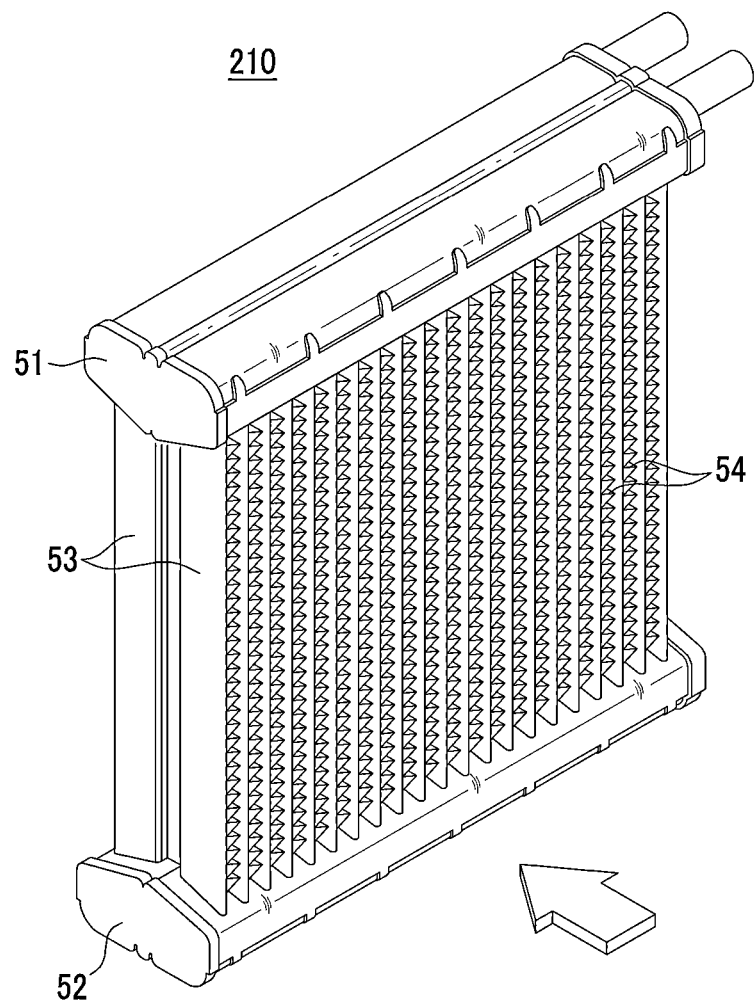
FIG. 13 is a schematic diagram of an evaporator according to another exemplary embodiment of the present invention.
Figure 14:
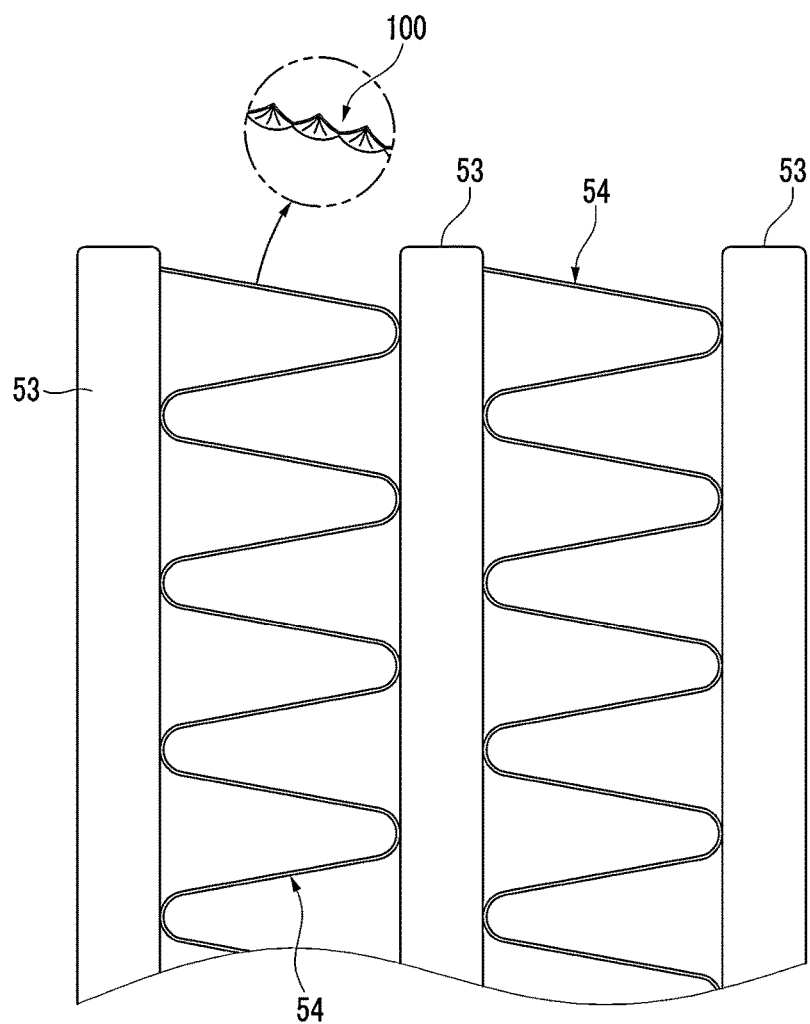
FIG. 14 is a partially enlarged view of the evaporator shown in FIG. 13.

FIG. 13 is a schematic diagram of an evaporator according to another exemplary embodiment of the present invention, and FIG. 14 is a partially enlarged view of the evaporator shown in FIG. 13. The evaporator shown in FIG. 13 is applied to an air conditioner for vehicles.

Referring to FIGS. 13 and 14, an evaporator 210 includes an upper header tank 51 and a lower header tank 52 positioned to be spaced apart from each other, a plurality of coolant tubes 53 fixed to the upper header tank 51 and the lower header tank 52 at both ends thereof and forming a coolant flow path, and a plurality of heat exchanger fins 54 coming into contact with the coolant tubes 53 and positioned between the coolant tubes 53.

The heat exchanger fins 54 exchange heat with the coolant tubes 53, and exchange heat with air coming into contact with a surface thereof. The heat exchanger fins 54 are bent in a zigzag pattern to form a waveform structure, thus maximizing a surface area coming into contact with air. Accordingly, the heat exchanger fins 54 increase a heat transfer area of the coolant tubes 53 to increase heat exchanging efficiency between the coolant and air.

The heat exchanger fins 54 are manufactured of a metal capable of being anodized, and an entire surface thereof is fabricated through the second step of the anodizing (S20) and the third step of polymer coating (S30) to form the super-hydrophobic surface 100. That is, the entire surface of the heat exchanger fins 54 is formed of the super-hydrophobic surface 100 of the present exemplary embodiment. The heat exchanger fins 54 delay implantation of the frost on the surface, and have an excellent defrosting effect.

In the evaporators 200 and 210, the super-hydrophobic surface 100 is easily applied to a three-dimensional structure having a complicated shape, such as the coolant tubes 40 and the heat exchanger fins 54. This is feasible because the super-hydrophobic surface 100 is not formed of only the duplicated polymer layer to be attached to a surface of an article, unlike the prior art.

That is, in the present exemplary embodiment, the article requiring a super-hydrophobic characteristic (the coolant tubes or the heat exchanger fins) is anodized, and the hydrophobic polymer is applied on the complex structure 20 of the ceramic layer 12 to form the super-hydrophobic surface. Accordingly, the super-hydrophobic surface 100 may be easily fabricated even in the complicated three-dimensional structure.

The evaporators 200 and 210 having the super-hydrophobic surface 100 have high durability due to excellent surface strength. Further, the super-hydrophobic surface 100 may be formed by an economical method in a short time, and heat exchanging efficiency may be increased due to an excellent defrosting effect.

Meanwhile, in the above, two types of evaporators 200 and 210 are described as application examples of the super-hydrophobic surface 100 according to the present exemplary embodiment. However, the super-hydrophobic surface 100 of the present exemplary embodiment may be applied to all heat exchangers having various types of structures requiring the rapid defrosting effect in addition to the evaporators 200 and 210.

While this invention has been described in connection with what is presently considered to be practical exemplary embodiments, it is to be understood that the invention is not limited to the disclosed embodiments, but, on the contrary, is intended to cover various modifications and equivalent arrangements included within the scope of the appended claims, detailed description of the invention, and drawings.

The invention claimed is:

1. A method for fabricating a super-hydrophobic surface, comprising:
preparing a metal base material;
anodizing the metal base material to form a ceramic layer having a complex structure of a mountain range-shaped microstructure and nano-fiber structures having a wire shape or a rod shape on a surface of the metal base material; and
applying a hydrophobic polymer material on the complex structure to form a polymer layer having the same surface shape as the complex structure,
wherein nano-holes are formed in the ceramic layer during an early stage of the anodizing,
wall surfaces of the nano-holes collapse due to enlargement of the nano-holes according to progress of the anodizing and wall surfaces having a high density remain at a center to form the complex structure formed of the nano-fiber structures,
during the anodizing, a temperature of an electrolyte solution is in a range of 0 to 40° C., and a voltage applied to the metal base material and a counter electrode is in a range of 20 to 200 V, and
an application time of the voltage to the metal base material and the counter electrode is in a range of 5 to 10 minutes.

2. The method of claim 1, wherein the metal base material includes at least one selected from the group consisting of aluminum, nickel, titanium, magnesium, and zinc.

3. The method of claim 1, wherein the polymer layer includes at least one selected from the group consisting of polydimethylsiloxane (PDMS), polytetrafluoroethylene (PTFE), a fluorinated ethylene propyl copolymer (FEP), perfluoroalkoxy (PFA), and (heptadecafluoro-1,1,2,2-tetrahydrodecyl)-trichlorosilane (HDFS).

4. The method of claim 1, wherein the polymer layer is coated with a monomolecular layer.

5. The method of claim 4, wherein the polymer layer has a thickness in a range of 1 Å or more and 5 nm or less.

6. An evaporator comprising
a coolant tube including a coolant flowing therein to exchange heat with fluidized air therearound,
wherein the coolant tube is constituted by a metal base material, and
an external circumferential surface of the coolant tube has a super-hydrophobic surface fabricated by the method according to claim 1.

7. An evaporator comprising:
an upper header tank and a lower header tank positioned to be spaced apart from each other;
a plurality of coolant tubes fixed to the upper header tank and the lower header tank at both ends thereof and forming a coolant flow path; and
a plurality of heat exchanger fins coming into contact with the coolant tubes, positioned between the coolant tubes, and coming into contact with external air at surfaces thereof,
wherein the heat exchanger fins are constituted by a metal base material, and have a super-hydrophobic surface fabricated by the method according to claim 1.

8. The evaporator of claim 7, wherein the heat exchanger fins are bent in a zigzag pattern to form a waveform structure.

9. An evaporator comprising
a coolant tube including a coolant flowing therein to exchange heat with fluidized air therearound,
wherein the coolant tube is constituted by a metal base material, and
an external circumferential surface of the coolant tube has a super-hydrophobic surface fabricated by the method according to claim 2.

10. An evaporator comprising:
an upper header tank and a lower header tank positioned to be spaced apart from each other;
a plurality of coolant tubes fixed to the upper header tank and the lower header tank at both ends thereof and forming a coolant flow path; and
a plurality of heat exchanger fins coming into contact with the coolant tubes, positioned between the coolant tubes, and coming into contact with external air at surfaces thereof,
wherein the heat exchanger fins are constituted by a metal base material, and have a super-hydrophobic surface fabricated by the method according to claim 2.

11. An evaporator comprising
a coolant tube including a coolant flowing therein to exchange heat with fluidized air therearound,
wherein the coolant tube is constituted by a metal base material, and
an external circumferential surface of the coolant tube has a super-hydrophobic surface fabricated by the method according to claim 1.

12. An evaporator comprising:
an upper header tank and a lower header tank positioned to be spaced apart from each other;
a plurality of coolant tubes fixed to the upper header tank and the lower header tank at both ends thereof and forming a coolant flow path; and
a plurality of heat exchanger fins coming into contact with the coolant tubes, positioned between the coolant tubes, and coming into contact with external air at surfaces thereof,
wherein the heat exchanger fins are constituted by a metal base material, and have a super-hydrophobic surface fabricated by the method according to claim 1.

13. An evaporator comprising
a coolant tube including a coolant flowing therein to exchange heat with fluidized air therearound, wherein the coolant tube is constituted by a metal base material, and an external circumferential surface of the coolant tube has a super-hydrophobic surface fabricated by the method according to claim 3.

14. An evaporator comprising:

an upper header tank and a lower header tank positioned to be spaced apart from each other;

a plurality of coolant tubes fixed to the upper header tank and the lower header tank at both ends thereof and forming a coolant flow path; and a plurality of heat exchanger fins coming into contact with the coolant tubes, positioned between the coolant tubes, and coming into contact with external air at surfaces thereof, wherein the heat exchanger fins are constituted by a metal base material, and have a super-hydrophobic surface fabricated by the method according to claim 3.

15. An evaporator comprising a coolant tube including a coolant flowing therein to exchange heat with fluidized air therearound, wherein the coolant tube is constituted by a metal base material, and an external circumferential surface of the coolant tube has a super-hydrophobic surface fabricated by the method according to claim 4.

16. An evaporator comprising:

an upper header tank and a lower header tank positioned to be spaced apart from each other;

a plurality of coolant tubes fixed to the upper header tank and the lower header tank at both ends thereof and forming a coolant flow path; and a plurality of heat exchanger fins coming into contact with the coolant tubes, positioned between the coolant tubes, and coming into contact with external air at surfaces thereof, wherein the heat exchanger fins are constituted by a metal base material, and have a super-hydrophobic surface fabricated by the method according to claim 4.

17. The evaporator of claim 16, wherein the heat exchanger fins are bent in a zigzag pattern to form a waveform structure.

* * * * *